(12) United States Patent
Walker

(10) Patent No.: US 10,877,975 B1
(45) Date of Patent: Dec. 29, 2020

(54) MACHINE LEARNING OF SELECTIONS OF ELECTRONIC RECORDS WITHIN A VIRTUAL ENVIRONMENT

(71) Applicant: Joseph H. Walker, Traverse City, MI (US)

(72) Inventor: Joseph H. Walker, Traverse City, MI (US)

( * ) Notice: Subject to any disclaimer, the term of this patent is extended or adjusted under 35 U.S.C. 154(b) by 736 days.

(21) Appl. No.: 15/490,992

(22) Filed: Apr. 19, 2017

(51) Int. Cl.
  *G06F 16/24* (2019.01)
  *G06F 16/2457* (2019.01)
  *G06N 20/00* (2019.01)
  *G06F 16/248* (2019.01)

(52) U.S. Cl.
  CPC ...... *G06F 16/24575* (2019.01); *G06F 16/248* (2019.01); *G06N 20/00* (2019.01)

(58) Field of Classification Search
  CPC .. G06F 16/24575; G06F 16/248; G06N 20/00
  See application file for complete search history.

(56) References Cited

U.S. PATENT DOCUMENTS

| | | | |
|---|---|---|---|
| 9,294,553 B1 * | 3/2016 | Vaswani | H04L 67/2847 |
| 10,354,312 B2 * | 7/2019 | Bhosle | G06Q 30/06 |
| 2008/0319846 A1 * | 12/2008 | Leming | G06Q 30/02 705/14.13 |
| 2012/0290332 A1 * | 11/2012 | Bradshaw | G06Q 40/08 705/4 |
| 2016/0005070 A1 * | 1/2016 | Burr | G06Q 30/0253 705/14.51 |
| 2016/0210674 A1 * | 7/2016 | Allen | G06Q 30/0605 |
| 2017/0221040 A1 * | 8/2017 | Ringo | G06Q 20/28 |
| 2018/0012287 A1 * | 1/2018 | Ma | G06Q 50/28 |
| 2018/0089712 A1 * | 3/2018 | Watanabe | G06Q 30/0201 |
| 2018/0181951 A1 * | 6/2018 | Goldfinger | G06Q 20/204 |
| 2019/0385208 A1 * | 12/2019 | Warren | G06Q 30/0625 |

* cited by examiner

*Primary Examiner* — Alicia M Willoughby
(74) *Attorney, Agent, or Firm* — Young Basile Hanlon & MacFarlane, P.C.

(57) ABSTRACT

Machine learning of selections of electronic records between a user environment and a customer environment is implemented using an intermediary virtual environment. A request received from the user environment includes a request for electronic records corresponding to the customer environment. A selection of electronic records is determined based on the request and transmitted to the user environment. A message received from the user environment includes an indication of one or more electronic records selected from the user environment. A next request from the customer environment includes a request to determine that a second selection of electronic records of the customer environment is indicated within the intermediary virtual environment. A message is transmitted to the customer environment responsive to determining that the second selection of electronic records corresponds to the one or more electronic records indicated from the user environment.

14 Claims, 12 Drawing Sheets

MACHINE LEARNING OF SELECTIONS OF ELECTRONIC RECORDS WITHIN A VIRTUAL ENVIRONMENT

TECHNICAL FIELD

This disclosure relates to machine learning of selections of electronic records within a virtual environment.

BACKGROUND

A server may include functionality for implementing a virtual environment accessible by a client. The virtual environment can include instructions for selectively communicating data with the client. For example, data of the virtual environment may be selectively shared with the client. The client may include functionality for using data shared by the server.

SUMMARY

Disclosed herein are implementations of systems and techniques for machine learning of selections of electronic records using a virtual environment.

In an implementation, a system is provided for machine learning of selections of electronic records between a user environment and a customer environment via an intermediary virtual environment. The system comprises a memory, a processor, and a network interface. The memory includes instructions executable by the processor to receive a first request from the user environment, wherein the first request includes a request for electronic records corresponding to the customer environment. The memory further includes instructions executable by the processor to determine a first selection of electronic records based on the first request, wherein ones of the first selection of electronic records include metadata associated with the user environment. The memory further includes instructions executable by the processor to transmit the first selection of electronic records to the user environment, wherein one or more electronic records of the first selection are selected within the user environment. The memory further includes instructions executable by the processor to receive a first message from the user environment, wherein the first message includes an indication of the one or more electronic records from the user environment. The memory further includes instructions executable by the processor to receive a second request from the customer environment, wherein the second request includes a request to determine that a second selection of electronic records of the customer environment is indicated within the intermediary virtual environment. The memory further includes instructions executable by the processor to determine whether the second selection of electronic records corresponds to the one or more electronic records indicated from the user environment. The memory further includes instructions executable by the processor to transmit a second message to the customer environment responsive to determining that the second selection of electronic records corresponds to the one or more electronic records indicated from the user environment.

In an implementation, a method is provided for machine learning of selections of electronic records between a user environment and a customer environment via an intermediary virtual environment. The method comprises receiving, within the intermediary virtual environment, a first request from the user environment, wherein the first request includes a request for electronic records corresponding to the customer environment. The method further comprises determining, using a machine learning mechanism of the intermediary virtual environment, a first selection of electronic records based on the first request, wherein ones of the first selection of electronic records include metadata associated with the user environment. The method further comprises transmitting, from the intermediary virtual environment, the first selection of electronic records to the user environment, wherein one or more electronic records of the first selection are selected within the user environment. The method further comprises receiving, within the intermediary virtual environment, a first message from the user environment, wherein the first message includes an indication of the one or more electronic records from the user environment. The method further comprises receiving, within the intermediary virtual environment, a second request from the customer environment, wherein the second request includes a request to determine that a second selection of electronic records of the customer environment is indicated within the intermediary virtual environment. The method further comprises determining, using the machine learning mechanism of the intermediary virtual environment, whether the second selection of electronic records corresponds to the one or more electronic records indicated from the user environment. The method further comprises transmitting, from the intermediary virtual environment, a second message to the customer environment responsive to determining that the second selection of electronic records corresponds to the one or more electronic records indicated from the user environment.

In an implementation, a non-transitory computer-readable storage medium is provided. The non-transitory computer-readable storage medium comprises processor-executable routines that, when executed by a processor, facilitate a performance of operations for machine learning of selections of electronic records selected between a user environment and a customer environment via an intermediary virtual environment. The operations comprise determining a first set of electronic records that correspond to the customer environment using data received from the user environment, wherein the data indicates the customer environment. The operations further comprise receiving input selecting one or more electronic records of the first set from an agent of the intermediary virtual environment, wherein the agent is installed within the user environment. The operations further comprise determining, responsive to receiving a signal indicating an interaction with a client of the customer environment, that a second set of electronic records of the customer environment correspond to the one or more electronic records.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
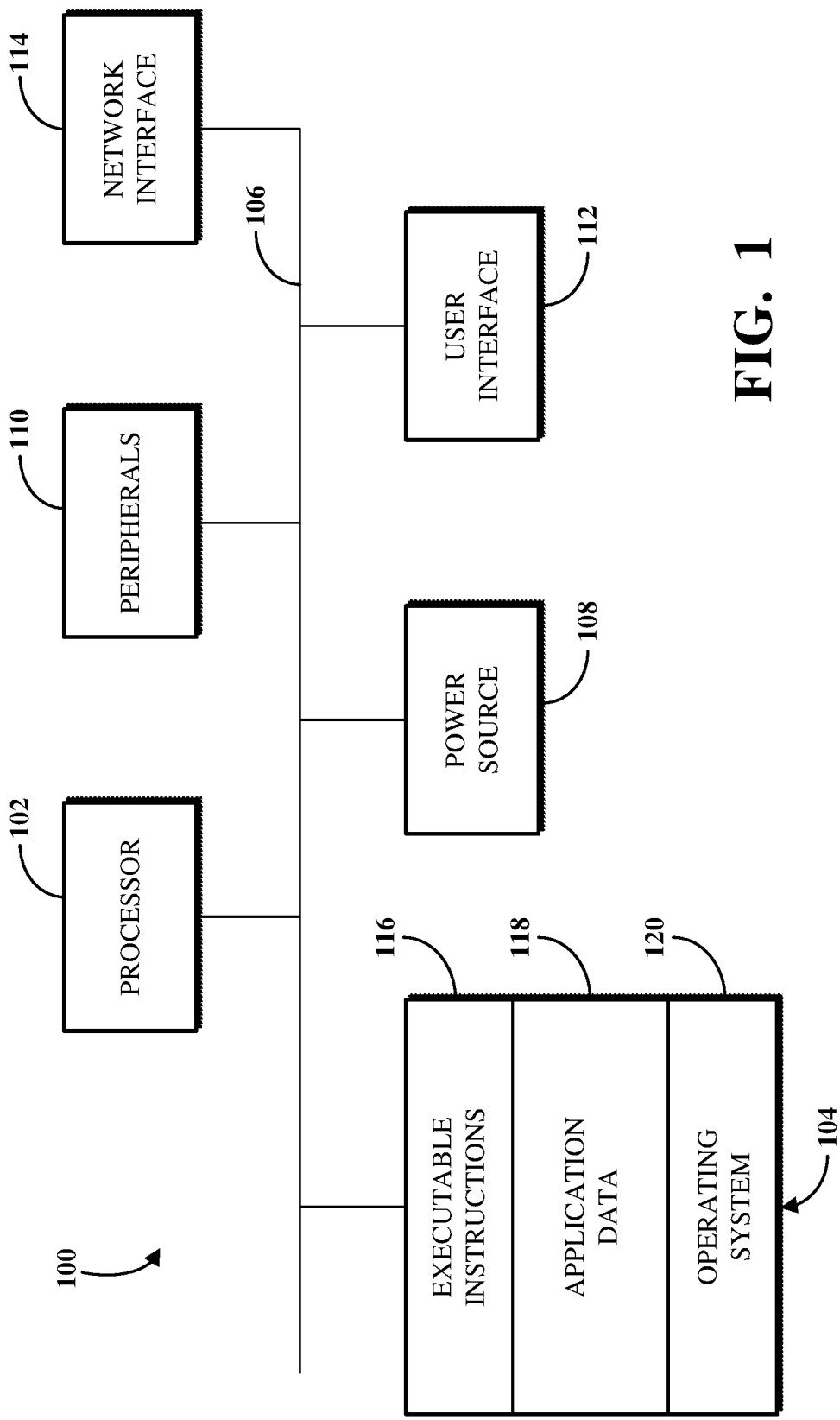
FIG. 1 is a block diagram of an example internal configuration of a computing device.

Implementations of this disclosure include machine learning of selections of electronic records. A request received from the user environment includes a request for electronic records corresponding to the customer environment. A selection of electronic records is determined based on the request and transmitted to the user environment. A message received from the user environment includes an indication of one or more electronic records selected from the user environment. A next request from the customer environment includes a request to determine that a second selection of electronic records of the customer environment is indicated within the intermediary virtual environment. A message is transmitted to the customer environment responsive to determining that the second selection of electronic records corresponds to the one or more electronic records indicated from the user environment To describe some implementations in greater detail, reference is first made to examples of hardware structures. FIG. 1 is a block diagram of an example internal configuration of a computing device 100. The computing device 100 includes components or units, such as a processor 102, a memory 104, a bus 106, a power source 108, peripherals 110, a user interface 112, and a network interface 114. One of more of the memory 104, the power source 108, the peripherals 110, the user interface 112, or the network interface 114 can communicate with the processor 102 via the bus 106.

The processor 102 is a central processing unit (CPU), such as a microprocessor, and can include single or multiple processors having single or multiple processing cores. Alternatively, the processor 102 can include another type of device, or multiple devices, now existing or hereafter developed, configured for manipulating or processing information. For example, the processor 102 can include multiple processors interconnected in any manner, including hardwired or networked, including wirelessly networked. For example, the operations of the processor 102 can be distributed across multiple devices or units that can be coupled directly or across a local area or other suitable type of network. The processor 102 can include a cache, or cache memory, for local storage of operating data or instructions.

The memory 104 includes one or more memory components, which may be volatile memory or non-volatile memory. For example, the volatile memory of the memory 104 can be a DRAM module (e.g., DDR SDRAM) or another form of volatile memory. In another example, the non-volatile memory of the memory 104 can be a disk drive, a solid state drive, flash memory, Phase-Change Memory (PCM), or another form of non-volatile memory configured for persistent electronic information storage. The memory 104 may also include other types of devices, now existing or hereafter developed, configured for storing data or instructions for processing by the processor 102.

The memory 104 can include data for immediate access by the processor 102. For example, the memory 104 can include executable instructions 116, application data 118, and an operating system 120. The executable instructions 116 can include one or more application programs, which can be loaded or copied, in whole or in part, from non-volatile memory to volatile memory to be executed by the processor 102. For example, the executable instructions 116 can include instructions for machine learning of selections of electronic records. The application data 118 can include user data, database data (e.g., database catalogs or dictionaries), or the like. The operating system 120 can be, for example, Microsoft Windows®, Mac OS X®, or Linux®; an operating system for a small device, such as a smartphone or tablet device; or an operating system for a large device, such as a mainframe computer.

The power source 108 includes a source for providing power to the computing device 100. For example, the power source 108 can be an interface to an external power distribution system. In another example, the power source 108 can be a battery, such as where the computing device 100 is configured to operate independently of an external power distribution system.

The peripherals 110 includes one or more sensors, detectors, or other devices configured for monitoring the computing device 100 or the environment around the computing device 100. For example, the peripherals 110 can include a geolocation component, such as a global positioning system (GPS) location unit. In another example, the peripherals can include a temperature sensor for measuring temperatures of components of the computing device 100, such as the processor 102.

The user interface 112 includes one or more input or output components. Examples of input our output components of the user interface 112 include a display, such as a liquid crystal display (LCD), a cathode-ray tube (CRT), a light emitting diode (LED) display (e.g., an OLED display), or other suitable display; a positional input device, such as a mouse, touchpad, touchscreen, or the like; a keyboard; or other suitable human or machine interface devices.

The network interface 114 provides a connection or link to a network, for example, the Internet, a local area network (LAN), a wide area network (WAN), a virtual private network (VPN), or another public or private network. The network interface 114 can be a wired network interface or a wireless network interface. The computing device 100 can communicate with other devices via the network interface 114 using one or more network protocols, such as Ethernet, TCP, IP, power line communication (PLC), Wi-Fi, infrared, GPRS, GSM, CDMA, or other suitable protocols.

Implementations of the computing device 100 of FIG. 1 can include additional, less, or combined functionality as compared to that described above, or functionality other than that described above, or combinations thereof. In some implementations, the computing device 100 can omit the peripherals 110. In some implementations, the memory 104 can be distributed across multiple devices. For example, the memory 104 can include network-based memory or memory in multiple clients or servers performing the operations of those multiple devices. In some implementations, the application data 118 can include functional programs, such as a web browser, a web server, a database server, another program, or a combination thereof.

Figure 2:
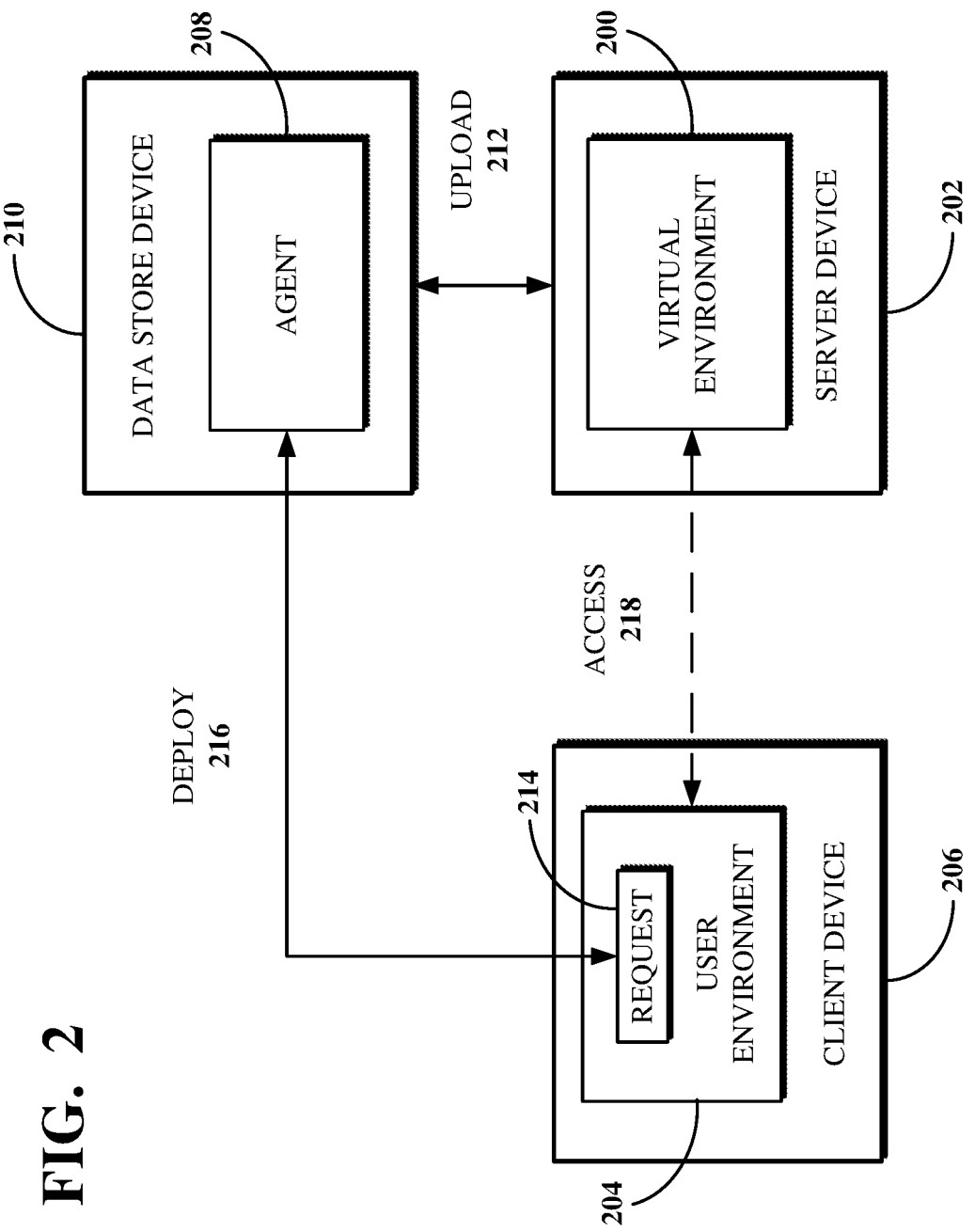
FIG. 2 is a block diagram of an example of a system for accessing a virtual environment of a server device from a user environment of a client device.

FIG. 2 is a block diagram of an example of a system for accessing a virtual environment 200 of a server device 202 from a user environment 204 of a client device 206. One or both of the server device 202 or the client device 206 can be a computing device, such as the computing device 100 shown in FIG. 1. For example, the client device 206 and the server device 202 can respectively be a client and server of a distributed computing system. For example, software executing on the server device 202 (e.g., within the virtual environment 200) can include functionality accessible or otherwise usable by the client device 206. As used herein, a client or server can be a computing system including multiple computing devices or a single computing device, such as a mobile phone, a tablet computer, a laptop computer, a notebook computer, a desktop computer, a server computer, or other suitable computing devices.

The user environment 204 can include computer resources available within a user space of an operating system of the client device 206, software executing within the user space of the operating system, other computational aspects controllable using the client device 206, or a combination thereof. For example, the client device 206 can be a mobile device, such as a smartphone. The user environment 204 can include an operating system of the smartphone (e.g., an Android or iOS operating system version), application software installed onto the smartphone (e.g., a web browser configured to process webpages, such as may be transmitted from a server; mobile applications, such as those downloaded using a store or like portal for facilitating downloads; or the like), input/output components of the smartphone (e.g., a multi-capacitive touch screen), user data stored to a memory or storage component of the smartphone (e.g., user configuration data, security information, cookies, or the like), or the like.

In another example, the user environment 204 can include a user account configured for the client device 206. For example, the client device 206 may be configured to have multiple user accounts associated with it. A user account may include a profile of an operating system of the client device 206, a profile of a web browser or like application software installed on the client device 206, or the like. Portions of the client device 206 may be external to the user environment 204. For example, an operating system of the client device 206 can include a kernel space, the access to which is restricted under an access control policy of the operating system. In another example, the client device 206 may not be under the control of a user of the user environment 204. The client device 206 may itself be a server operating at a datacenter (e.g., the datacenter 108 shown in FIG. 1), and the user environment 204 may refer to an environment enabled on the server for user access.

The virtual environment 200 can include a software environment implemented by components of the server device 202. For example, the server device 202 can include instructions for processing a webpage or similar web browser aspect, such as using an HTML interpreter, a JavaScript interpreter, or the like. The webpage can include one or more structured languages interpretable by the web browser 404, for example, HTML, JavaScript, CSS, or the like. The server device 202 can further include or otherwise have access to a database or other data store for storing data used to render the webpage, for example, content data populated throughout the webpage, user data available to a user of a client, or the like.

In another example, the server device 202 can include one or more virtual machines (e.g., Java Virtual Machines) and one or more MySQL, MongoDB, or like database systems for implementing a cloud-based software environment. For example, the server device 202 can be operated by a Software-as-a-Service (SaaS) or like computing provider for providing cloud-based software services in single-tenant or multi-tenant environments.

Access to the virtual environment 200 from the user environment 204 can be controlled using an agent 208 available at a data store device 210. The agent 208 includes software controllable by or from the virtual environment 200. For example, the agent 208 can be a software agent of the virtual environment 200. The agent 208 can be included within a mobile application accessible from the data store device 210. For example, installing the mobile application on the client device 206 can cause the agent 208 to also be installed on the client device 206. The data store device 210 may be, for example, a computing device, such as the computing device 100 shown in FIG. 1. For example, the data store device 210 can be a server operated by a third-party, such as a developer or like operator of a mobile device operating system. The data store device 210 can include a store portal accessible using the user environment 204. For example, a client-side application installed on the client device 206 can be used to access the store portal executing on the data store device 210.

The server device 202 includes functionality for uploading the agent 208 to the data store device 210 via 212. For example, the server device 202 can include a network interface in communication with a network interface of the data store device 210. Software executing on the server device 202 (e.g., internal or external to the virtual environment 200) can cause application software, plugins, patches, or like computational aspects to be uploaded via 212 to the data store device 210. For example, the server device 200 can upload a mobile application downloadable by the client device 206, which mobile application includes the agent 208.

Responsive to the upload via 212, the data store device 210 can make the agent 208 available to the client device 206. The client device 206 can connect to the data store device 210 to download the agent 208 from the data store device 210. The user environment 204 can transmit a request 214 for the agent 208 (or for a mobile application or like application software including the agent, as applicable) to the data store device 210. For example, where the client device 206 is a smartphone, the request 214 be generated responsive to a command received from a user of the smartphone to download a mobile application including the agent 208 from the data store device 210. Responsive to the request 214, the data store device 210 can deploy the agent 208 via 216 to the client device 206 for use with the user environment 204.

Responsive to the deployment of the agent 208 via 216, the agent 208 can enable access of the user environment 204 to the virtual environment 200 via 218. For example, the agent 208 can be used to open a port of the server device 202 for transmitting data to and receiving data from the client device 206. In another example, the agent 208 can include instructions for causing the server device 202 to execute server-side script instructions used to run application software within the virtual environment 202, process a webpage of the virtual environment 200, or the like, or a combination thereof. Examples of instructions for implementing the access via 218 are shown below as Computer Program Listing 1 and Computer Program Listing 2.

Implementations of the system of FIG. 2 can include additional, less, or combined functionality as compared to that described above, or functionality other than that described above, or combinations thereof. In some implementations, the data store device 210 can be omitted. For example, the agent 208 can be deployed to the client device 206 from the server device 202. The client device 206 can transmit the request 214 to the server device 202. The server device 202 may include a data store internal or external to the virtual environment 200 that includes the agent 208. The server device 202 may respond to the request 214 by deploying the agent 208 to the client device 206. In such implementations, the upload of the agent 208 via 212 may also be omitted.

Figure 3:
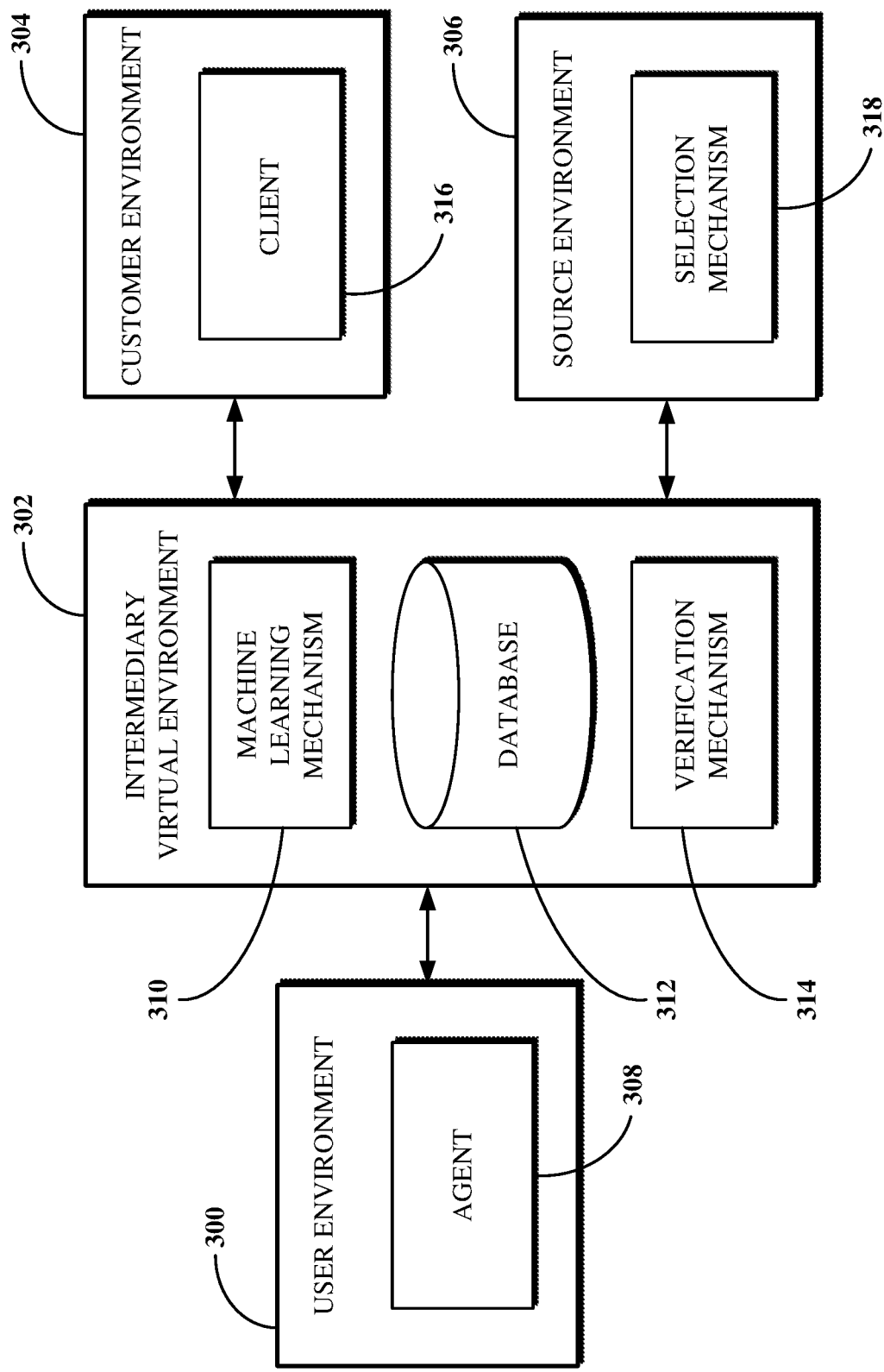
FIG. 3 is a block diagram of an example of a system for machine learning of selections of electronic records.

FIG. 3 is a block diagram of an example of a system for machine learning of selections of electronic records. The system includes a user environment 300, an intermediary virtual environment 302, a customer environment 304, and a source environment 306. The user environment 300 and intermediary virtual environment 302 may, for example, respectively be the user environment 204 and the virtual environment 200 shown in FIG. 2.

The user environment 300, the intermediary virtual environment 302, the customer environment 304, and the source environment 306 each includes at least one computing device, such as the computing device 100 shown in FIG. 1. For example, a computing device of one of the user environment 300, the intermediary virtual environment 302, the customer environment 304, or the source environment 306 can be a client or a server (e.g., the client device 206, the server device 202, or the data store server 210 shown in FIG. 2).

Data exchanged between ones of the user environment 300, the intermediary virtual environment 302, the customer environment 304, and the source environment 306 are used for machine learning of selections of electronic records. As used herein, an electronic record refers to a static or dynamic record representing a tangible product. An electronic record can be a static or dynamic record viewable in whole or in part from the user environment 200. An electronic record can be stored and processed using databases, software, or the like of the intermediary virtual environment 302. An electronic record may have a common form between the user environment 300, the intermediary virtual environment 302, the customer environment 304, and the source environment 306. Alternatively, an electronic record may have different forms in ones of the user environment 300, the intermediary virtual environment 302, the customer environment 304, and the source environment 306. For example, an electronic record processed at one of the customer environment 304 or the source environment 306 may include secure data specific thereto, which secure data may not be available at the intermediary virtual environment 302 or the user environment 300.

The user environment 300 includes an agent 308. The agent 308 may, for example, be the agent 208 shown in FIG. 2. The agent 308 includes functionality for receiving electronic records from the intermediary virtual environment 302 and transmitting indications of selected ones of the electronic records from the client device 300.

The intermediary virtual environment 302 includes a machine learning mechanism 310, a database 312, and a verification mechanism 314. The machine learning mechanism 310 includes functionality for intelligently identifying patterns of selections of electronic records from the user environment 300. The database 312 stores electronic records transmitted from the source environment 306, such as for selection at the user environment 300. The verification mechanism 314 includes functionality for verifying that selected electronic records have been processed at the customer environment 304.

The customer environment 304 includes a client 316. The client 316 can include hardware and/or software components for processing selections of electronic records made from the user environment 300. For example, the client 316 can include a computing device configured to receive indications of selections of electronic records from the intermediary virtual environment 302.

The source environment 306 includes a selection mechanism 318. The selection mechanism 318 includes functionality for determining collections of electronic records to transmit to the intermediary virtual environment 302, such as for making those electronic records available for selection from the user environment 300.

Electronic records generated at or otherwise made available by the source environment 306 can be selectively transmitted to the intermediary virtual environment 302. The user environment 300 can receive selections of electronic records from the intermediary virtual environment 302. A user of the user environment 300 can select one or more of those electronic records, and the user environment 300 can responsively transmit an indication of those selected one or more electronic records to the intermediary virtual environment 302. The intermediary virtual environment 302 can transmit the indicated electronic records to the customer environment 304 to verify that the customer environment 304 processes those electronic records.

The electronic records available for selection from the user environment 300 can be updated, such as by inserting new electronic records within a table of the database 312, deleting existing electronic records from a table of the database 312, modifying existing electronic records within a table of the database 312, or the like. For example, the database 312 can be updated responsive to data received at the intermediary virtual environment 302 from the source environment 306. For example, the selection mechanism 318 can include functionality for analyzing selections of electronic records made from the user environment 300 to determine how to update the electronic records available to the intermediary virtual environment 302. The selection mechanism 318 can transmit instructions to machine learning mechanism 310 to update the database 312, such as by adding, removing, or otherwise modifying the data stored therein.

The agent 308 can include functionality used by the machine learning mechanism 310 of the intermediary virtual environment 302. For example, the agent 308 can monitor selections of electronic records made from the user environment 300, viewings of electronic records by a user of the user environment 300, or the like. The agent 308 can receive data from and transmit data to the machine learning mechanism 310, such as to identify patterns in selection or viewings of electronic records within the user environment 300.

The machine learning mechanism 310 can use predictive modeling to identify ones of the electronic records likely to be selected from the user environment 300. For example, the machine learning mechanism 310 can analyze past indications of selected electronic records to determine contexts associated with those selected electronic records. A context associated with an electronic record can include a location of the customer environment 304, an identifier of the source environment 306, a category of product to which the electronic record corresponds, other factors, or a combination thereof. As such, the intermediary virtual environment can include a platform for predictive modeling of selections of electronic records.

Implementations of the system of FIG. 3 can include additional, less, or combined functionality as compared to that described above, or functionality other than that described above, or combinations thereof. In some implementations, there may be a plurality of user environments, customer environments, and/or source environments. For example, the system may be implemented in a retail setting, such as where the source environment 306 corresponds to a product brand that makes coupons available for use by end-user shoppers, the customer environment 304 corresponds to a retail outlet at which an end-user acquires products, and the user environment 300 corresponds to a mobile device of an end-user shopper. The intermediary virtual environment 302 may process collections of electronic records received from multiple source environments, verify the processing selected electronic records at multiple customer environments, and transmit elections records for selection to multiple user environments.

Figure 4:
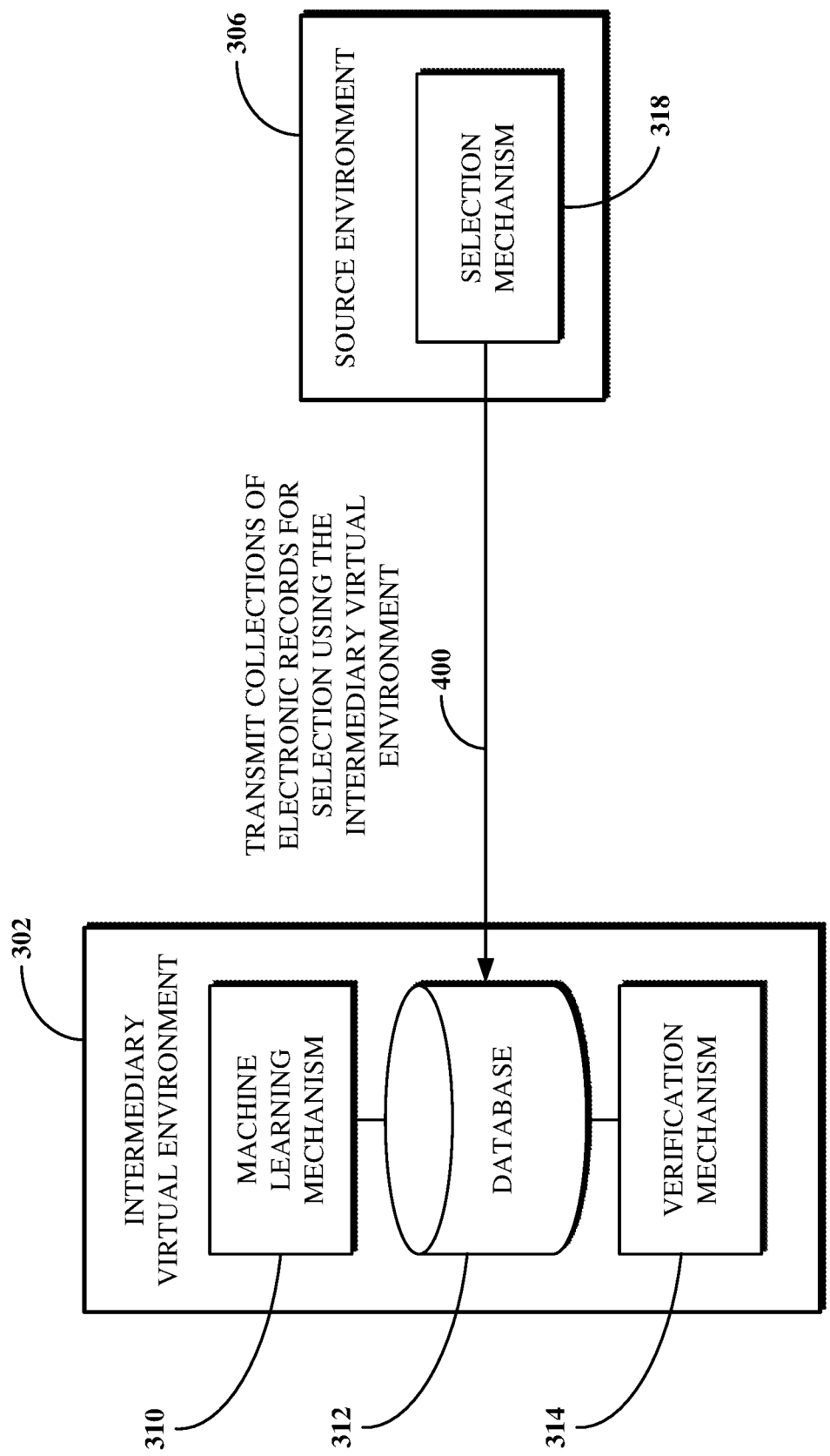
FIG. 4 is a block diagram of an example transmission of collections of electronic records between a source environment and an intermediary virtual environment.

FIG. 4 is a block diagram of an example transmission of collections of electronic records between a source environment and an intermediary virtual environment (e.g., respectively, the source environment 306 and intermediary virtual environment 302 shown in FIG. 3). At 400, a collection of electronic records is transmitted from the source environment 306 to the database 312 of the intermediary virtual environment 302. The collection of electronic records is identified using the selection mechanism 318 of the source environment 306. Transmitting the collection of electronic records to the database 312 can include the selection mechanism 318 transmitting the collection of electronic records first querying same from database accessible to the source environment (not shown), the selection mechanism 318 transmitting instructions for transmitting the collection of electronic records to another mechanism of the source environment 306, or the like, or a combination thereof.

The source environment 306 can include a number of electronic records, where a subset of those electronic records are selected for transmission by the selection mechanism 318. For example, an initial selection by the selection mechanism 318 (e.g., a selection without using predictive modeling, such as may be generated or otherwise determined using the machine learning mechanism 310 of the intermediary virtual environment 302) can be based on initial data indicating a collection of products likely to have retail success. The electronic records corresponding to that collection of products can be selected by the selection mechanism 318 and thereafter transmitted to the database 312 of the intermediary virtual environment 302.

Figure 5:
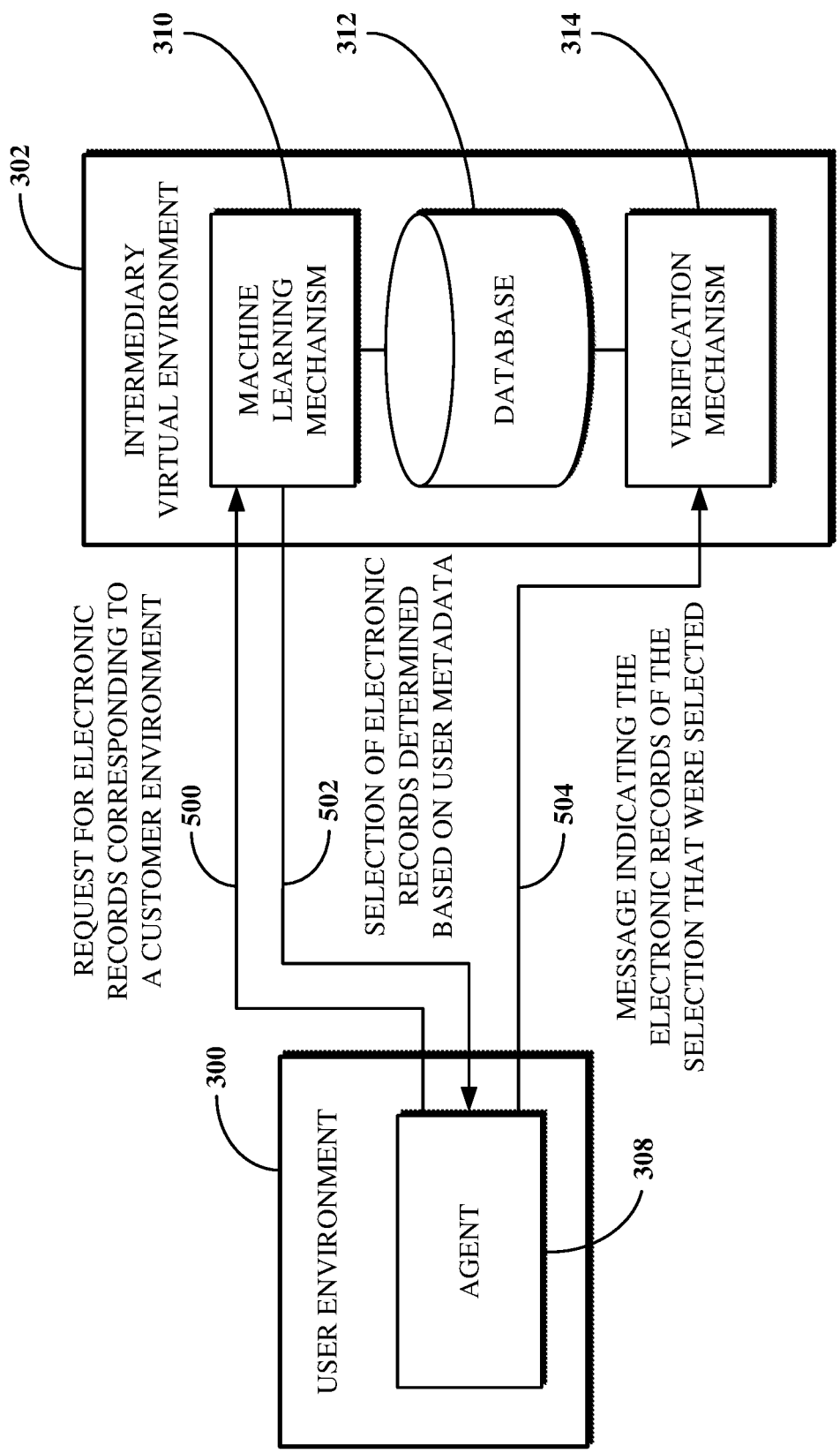
FIG. 5 is a block diagram of an example transmission of requests and messages for selections of electronic records between a user environment and an intermediary virtual environment.

FIG. 5 is a block diagram of an example transmission of requests and messages for selections of electronic records between a user environment and an intermediary virtual environment (e.g., respectively, the user environment 300 and the intermediary virtual environment 302 shown in FIG. 3). At 500, a request for electronic records corresponding to a customer environment (e.g., the customer environment 304 shown in FIG. 3) is transmitted from the user environment 300 to the intermediary virtual environment 302. The request can include metadata generated at or otherwise collected within the user environment 300. For example, the metadata can indicate a geolocation of the user environment 300. The request can be processed based on electronic records of a customer environment that is associated with that geo-location. For example, the request can be a request for electronic records associated with a physical environment in which an operator of the user environment is located. The request can be transmitted using the agent 308. The request can be received by the machine learning mechanism 310. Alternatively, the request can be received by another aspect of the intermediary virtual environment 302 and thereafter transmitted to the machine learning mechanism 310.

At 502, the machine learning mechanism 310 can process the request received at 500 to determine a selection of electronic records to indicate to the user environment 300. The electronic records corresponding to the customer environment can be a subset of the electronic records stored in the database 312. The machine learning mechanism 310 can determine the selection of electronic records by querying the database 312 for a set of electronic records corresponding to the customer environment. The machine learning mechanism 310 can also process the request received at 500 by querying the database for metadata indicative of user preferences associated with the set of electronic records, metadata indicative of previously selected electronic records, or the like. The selection of electronic records can be determined based on the results of one or more of those database queries. The selection of electronic records can then be transmitted to the user environment 300.

In some implementations, the machine learning mechanism 310 can process the request received at 500 based on a time at which the request is received. For example, one or more electronic records stored in the database 312 may have a staleness period. Upon the expiration of the staleness period, those electronic records may be removed from the database 314 or otherwise become invalid (e.g., they may no longer be selected by the machine learning mechanism 310 or indicated using the agent 308). For example, the one or more electronic records may pertain to an event occurring within a physical space associated with an operator of the customer environment, a source environment, or both. The machine learning mechanism 310 can process a request received at 500 by determining that an operator of the user environment 300 is present within such a physical space and transmit a selection of electronic records including one or more electronic records having a staleness period. For example, the staleness period can be a definite period of time within which a corresponding electronic record remains selectable by the machine learning mechanism 310 or indicatable using the agent 308 (e.g., to the extent a selection including such electronic record has already been transmitted to the user environment 300). In another example, the staleness period can refer to a period of time while an operator of the user environment 300 remains in the physical space. For example, the staleness period can expire upon a determination that the operator of the user environment 300 has left the physical space.

At 504, the agent 308 can transmit a message to the intermediary virtual environment 302. The agent 308 or another aspect of the user environment 300 can generate the message responsive to a user of the user environment 300 selecting one or more of the electronic records included in the selection of electronic records transmitted from the intermediary virtual environment 302 at 502. The message indicates which of the electronic records of the selection have been selected within the user environment 300. For example, the message can be or include a JSON file generated by the agent 308, such as based on the indicated electronic records. The message can be received by the verification mechanism 314 of the intermediary virtual environment 302. For example, the verification mechanism 314 can process the message to verify that the indicated electronic records were included in the selection transmitted at 502. The verification mechanism 314 can generate metadata indicative of the indicated electronic records and store that metadata in the database 312 (e.g., for use in determining further selections of electronic records to transmit to the user environment 300). For example, the verification mechanism 314 can update metadata previously stored in the database 312 according to the newly generated metadata. Examples of instructions for requesting or processing requests for selections of electronic records are shown below as Computer Program Listing 3 and Computer Program Listing 4.

Figure 6:
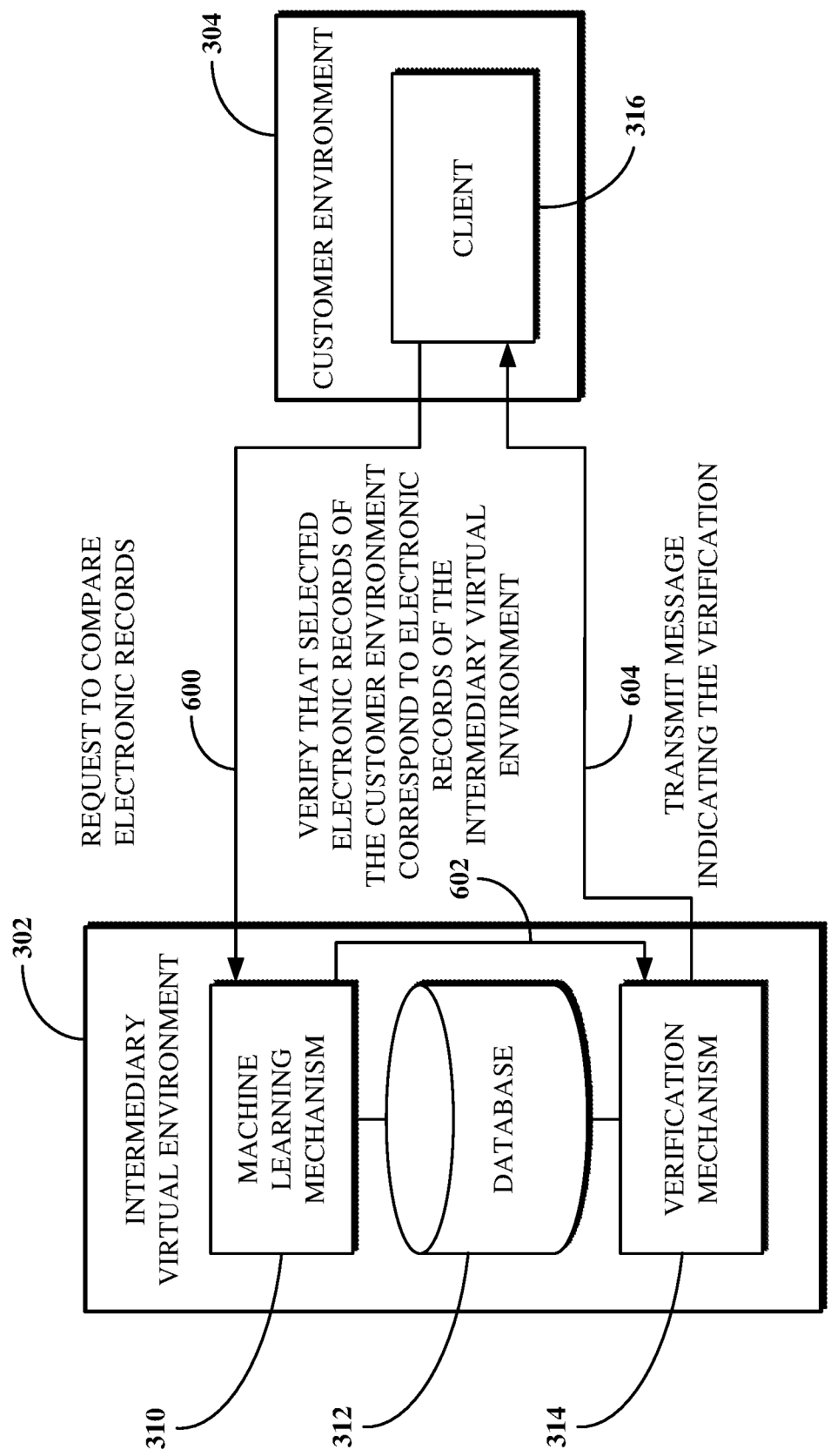
FIG. 6 is a block diagram of an example transmission of verifications of selections of electronic records between a customer environment and an intermediary virtual environment.

FIG. 6 is a block diagram of an example transmission of verifications of selections of electronic records between a customer environment and an intermediary virtual environment (e.g., the customer environment 304 and the intermediary virtual environment 302 shown in FIG. 3). At 600, the customer environment 304 transmits a request to compare electronic records to the intermediary virtual environment 302. The request can be transmitted from the client 316 of the customer environment 304 and received by the machine learning mechanism 310 of the intermediary virtual environment 302. The request is a request to compare electronic records processed using the client 316 with electronic records previously selected from a user environment (e.g., the user environment 300 shown in FIG. 3). The request includes an indication of the electronic records processed using the client 316.

At 602, the machine learning mechanism 310, using the verification mechanism 314, verifies that the selected electronic records processed within the customer environment 304 correspond to the electronic records selected from the user environment. For example, the verification mechanism 314 can access a message transmitted from the user environment to the intermediary virtual environment 302 including an indication of the electronic records selected from the user environment. The verification mechanism 314 can compare identifiers or other data associated with ones of the electronic records processed at the customer environment 304 with ones of the electronic records selected from the user environment to verify the correspondence.

At 604, a message indicating the verification is transmitted from the intermediary virtual environment 302 to the customer environment 304. For example, the message can be generated by the verification mechanism 314 responsive to the verification at 602. The verification mechanism 314 can then transmit the message to the client 316 of the customer environment 304. For example, the message transmitted at 604 can indicate a fulfillment of a retail transaction between a user of the user environment and a retail outlet of the customer environment 304.

Figure 7:
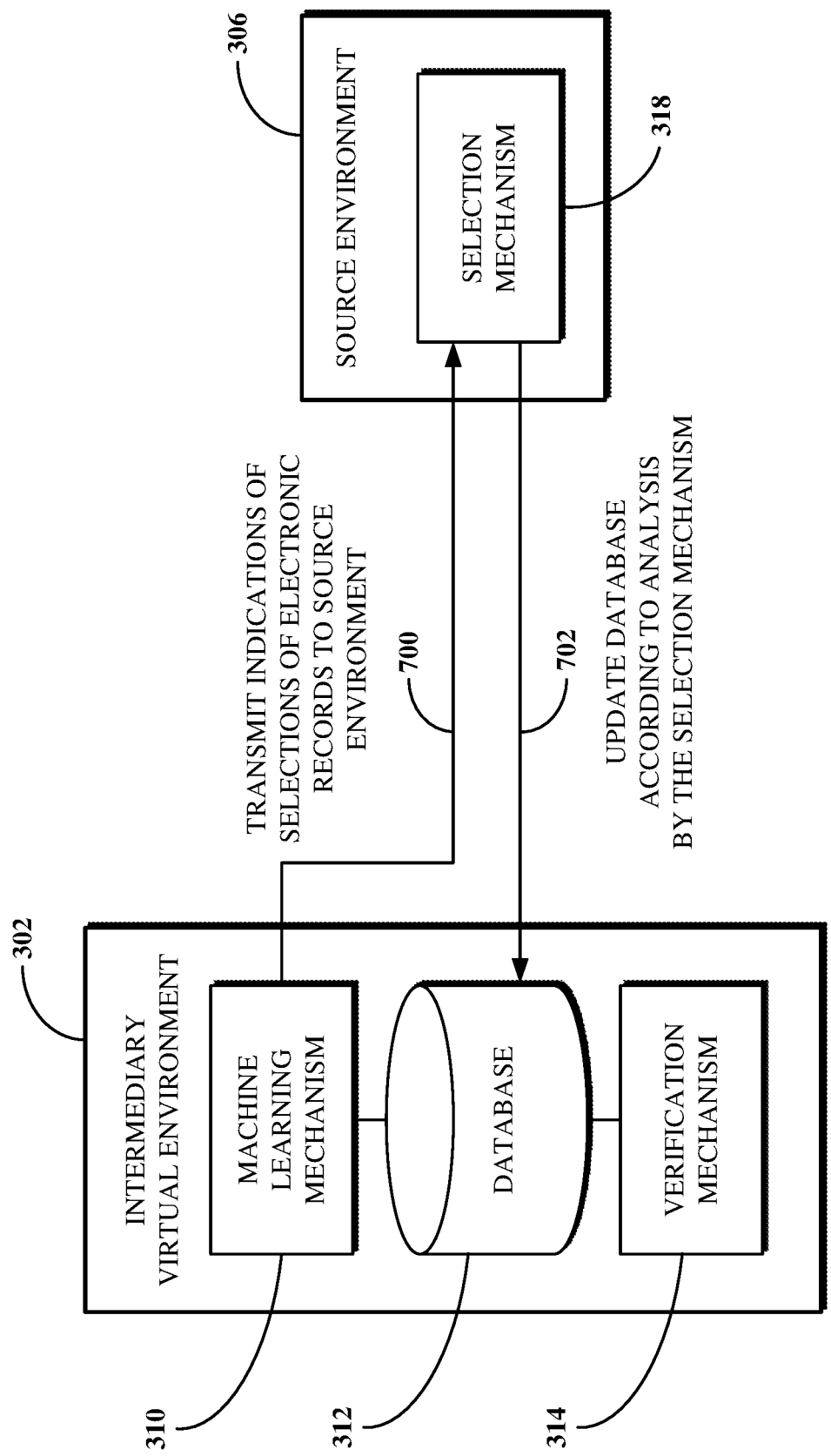
FIG. 7 is a block diagram of an example transmission of indications of selections of electronic records between a source environment and an intermediary virtual environment.

FIG. 7 is a block diagram of an example transmission of indications of selections of electronic records between a source environment and an intermediary virtual environment (e.g., the source environment 306 and the intermediary virtual environment 302 shown in FIG. 3). At 700, indications of selections of electronic records are transmitted from the intermediary virtual environment 302 to the source environment 306. For example, the machine learning mechanism 310 of the intermediary virtual environment 302 can transmit the indications to the section mechanism 318 of the source environment 306. For example, in a retail usage, the indications of selections of electronic records can include user and product metrics indicative of user preferences for selecting electronic records and products corresponding to the selected electronic records. The indications can be transmitted at 700 responsive to the fulfillment of a retail transaction between a user of the user environment and a retail outlet of a customer environment. Alternatively, the indications can be transmitted at 700 responsive to being received by the intermediary virtual environment 302, such as prior to the fulfillment of a retail transaction involving the indicated electronic records.

The selection mechanism 318 includes functionality for analyzing the indications of selections of electronic records transmitted to it, such as to optimize collections of electronic records originated at the source environment 306 that are stored in the database 312 (e.g., for selection from a user environment, such as the user environment 300 shown in FIG. 3). The selection mechanism 318 can analyze the transmitted indications by determining similarities between the selected electronic records and other electronic records made available to the intermediary virtual environment 302. The selection mechanism 318 can identify ones of those other electronic records that are similar to the selected electronic records to generate and transmit further electronic records related thereto to the intermediary virtual environment 302. For example, where a selected electronic record corresponds to a smartphone case for an Android-operated smartphone, the selection mechanism 318 can identify and transmit to the intermediary virtual environment 302 an electronic record corresponding to a smartphone holder for Android-operated smartphones. Relatedly, the selection mechanism 318 can determine ones of those other electronic records that are not similar to the selected electronic records (e.g., using the above smartphone case example, an electronic record corresponding to a smartphone power cable for iOS-operated smartphones).

At 702, analysis data of the selection mechanism 318 can be used to update the electronic records stored in the database 312. Updating the database 312 can include adding new electronic records to the database 312, such as where the new electronic records are identified by the selection mechanism 318 as being related to electronic records previously selected from the user environment. Updating the database 312 can include deleting existing electronic records from the database 312, such as where those existing electronic records are identified by the selection mechanism 318 as being unrelated to electronic records previously selected from the user environment. Updating the database 312 can include modifying existing electronic records, such as to associate metadata with those electronic records. For example, the metadata can indicate that an associated electronic record was analyzed by the selection mechanism 318 according to the indications of selected electronic records received at 700.

Figure 8:
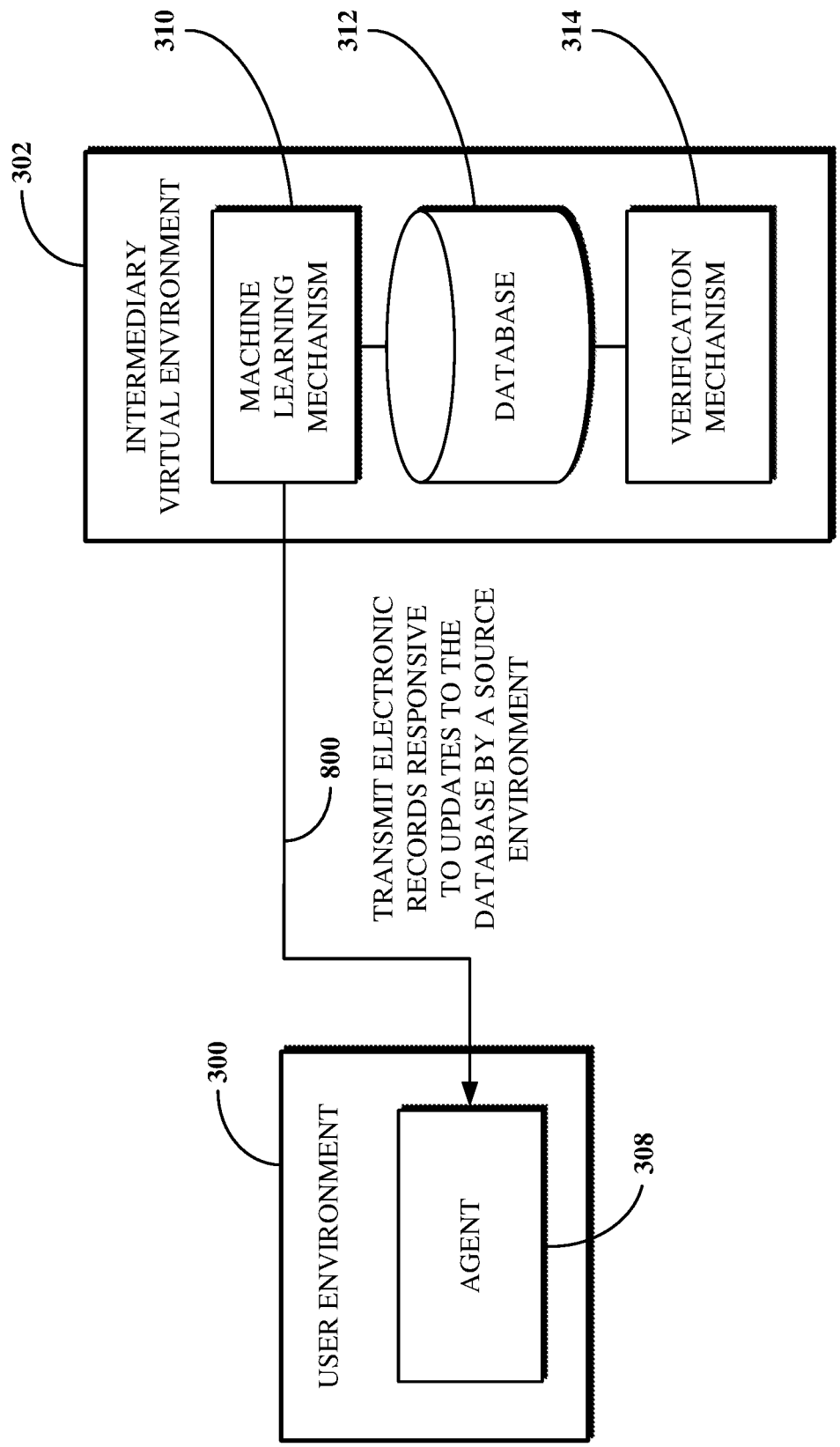
FIG. 8 is a block diagram of an example transmission of electronic records between a user environment and an intermediary virtual environment.

FIG. 8 is a block diagram of an example transmission of electronic records between a user environment and an intermediary virtual environment (e.g., the user environment 300 and the intermediary virtual environment 302 shown in FIG. 3). At 800, one or more selections of electronic records can be transmitted from the intermediary virtual environment 302 to the user environment 300 responsive to an update to data stored in the database 312. For example, the database 312 can be updated responsive to transmissions received from a source environment (e.g., the source environment 306 shown in FIG. 3). The transmission at 800 can occur so that electronic records selectable from the user environment 300 reflect the selections of electronic records stored in the database 312. Responsive to the transmission 800, locally stored copies of electronic records that were changed in or removed from the database 312 per the update may be removed from the user environment 300. The transmission at 800 can be responsive to the fulfillment of a retail transaction between a user of the user environment and a retail outlet of a customer environment. Alternatively, the transmission at 800 can be responsive to the intermediary virtual environment 302 updating electronic records stored in the database 312, such as prior to the fulfillment of a retail transaction involving the indicated electronic records and responsive to a request for the update received from a source environment.

Figure 9A:
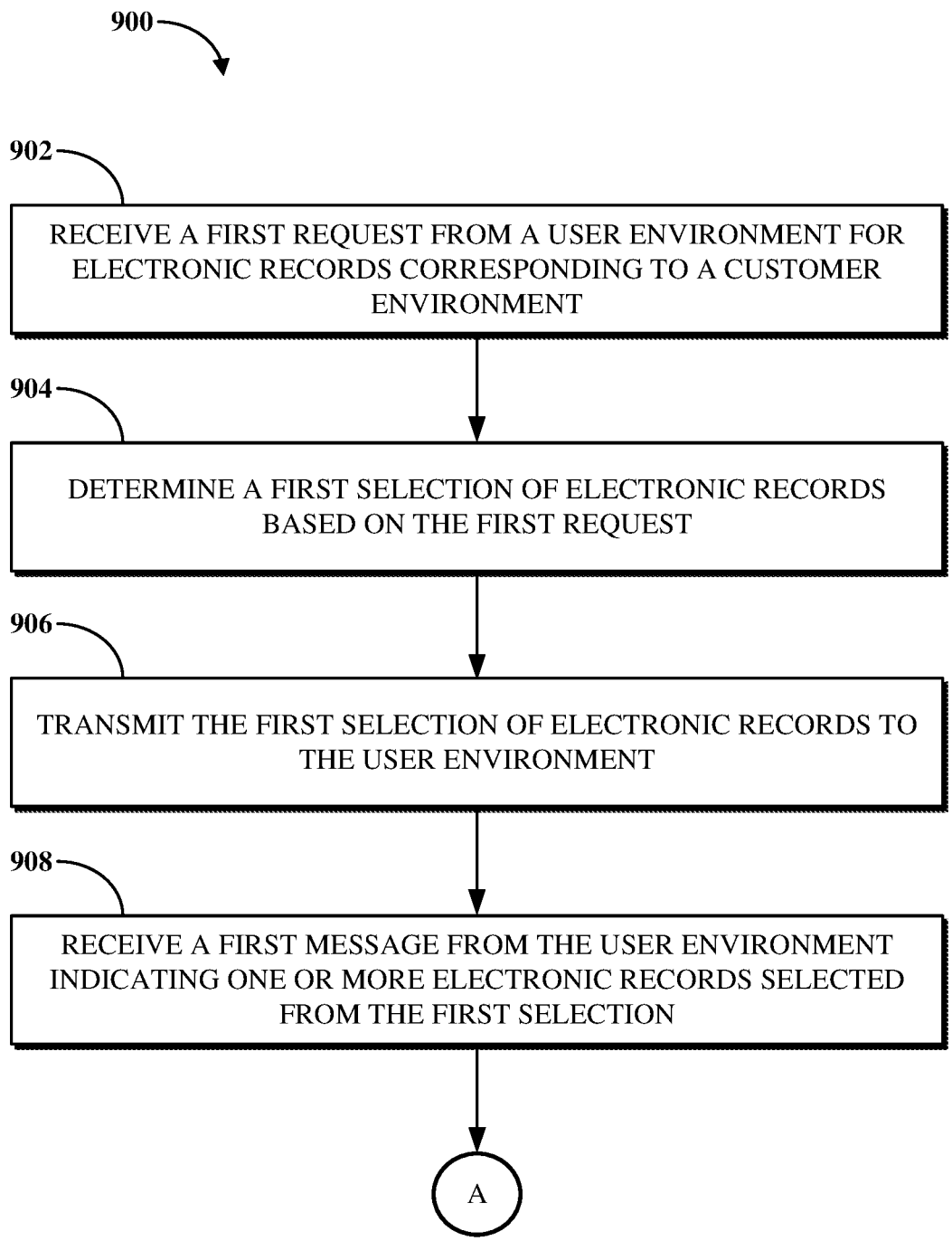
FIGS. 9A-B are flowcharts illustrating an example of a first technique for machine learning of selections of electronic records.
Figure 9B:
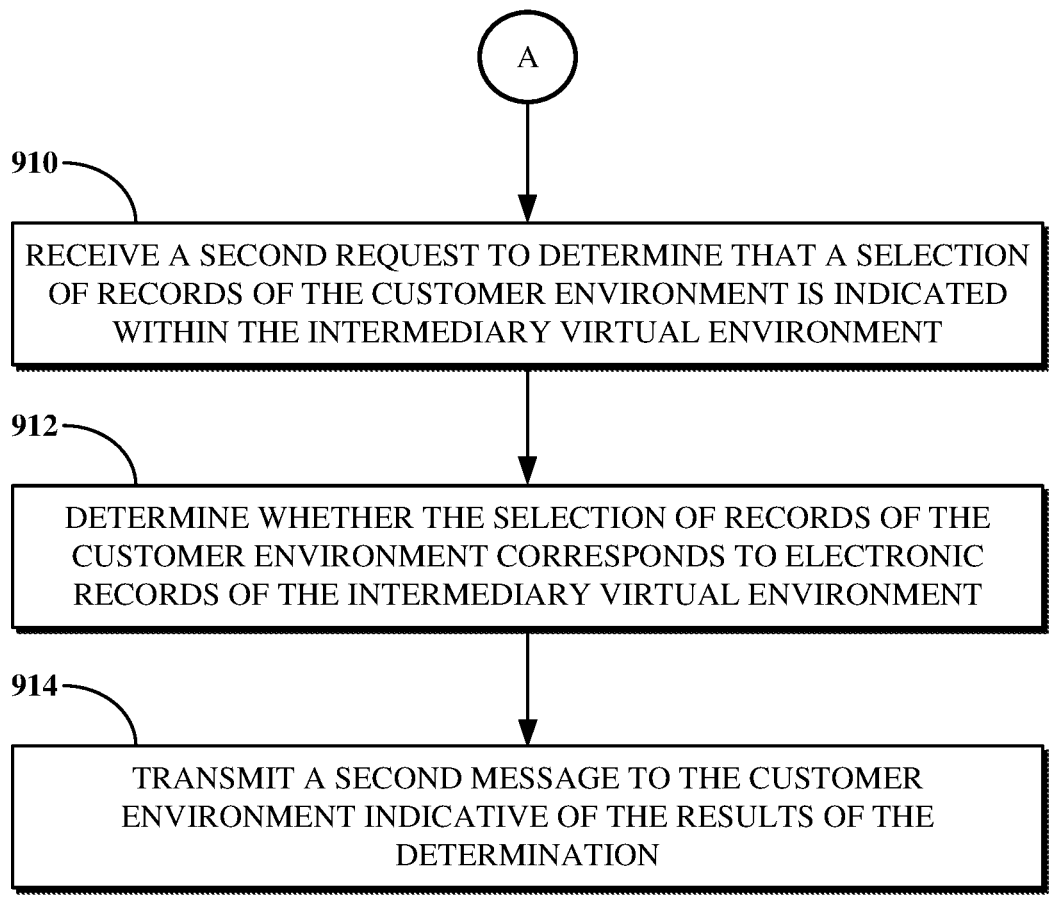
Figure 10:
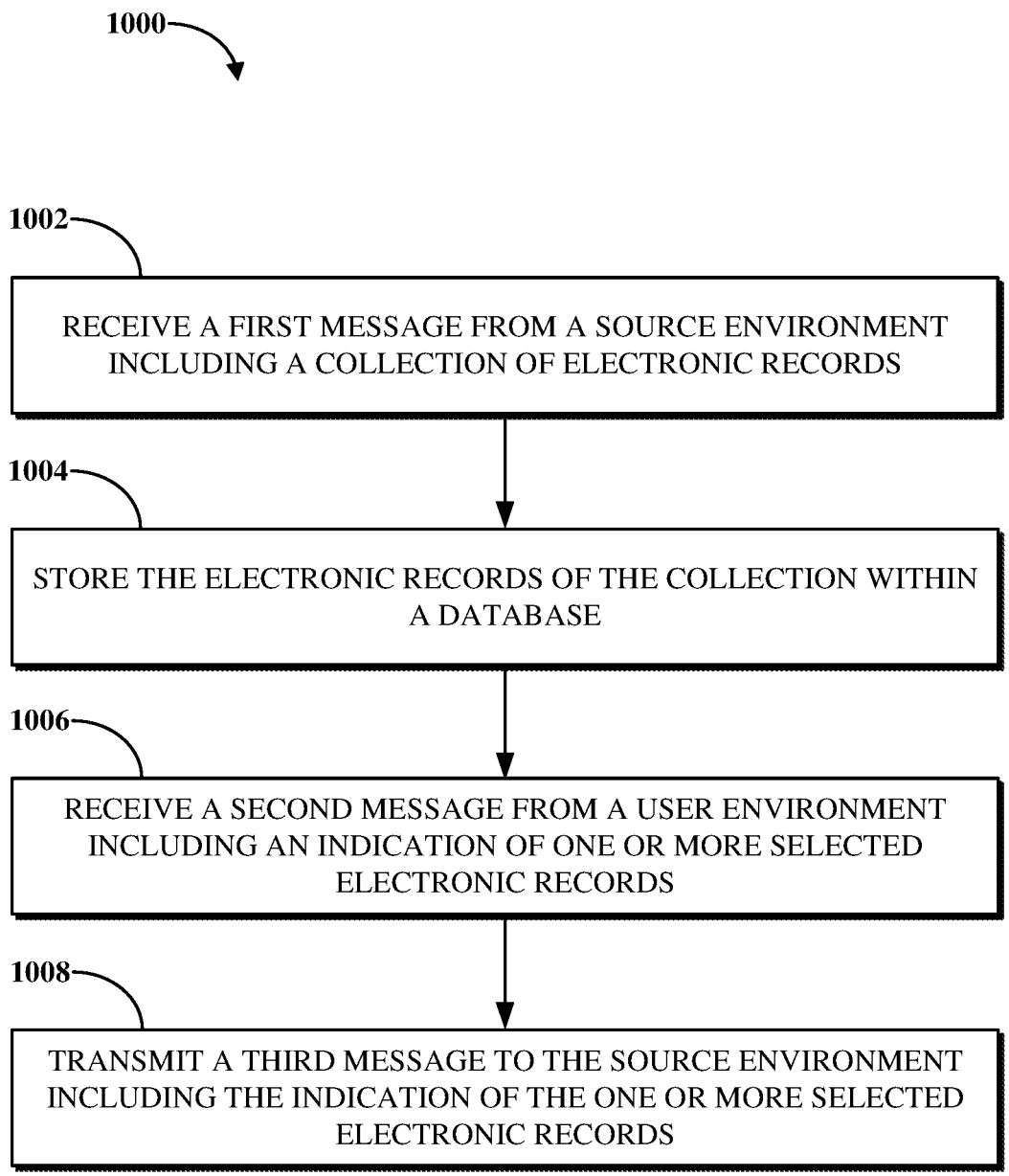
FIG. 10 is a flowchart illustrating an example of a second technique for machine learning of selections of electronic records
Figure 11:
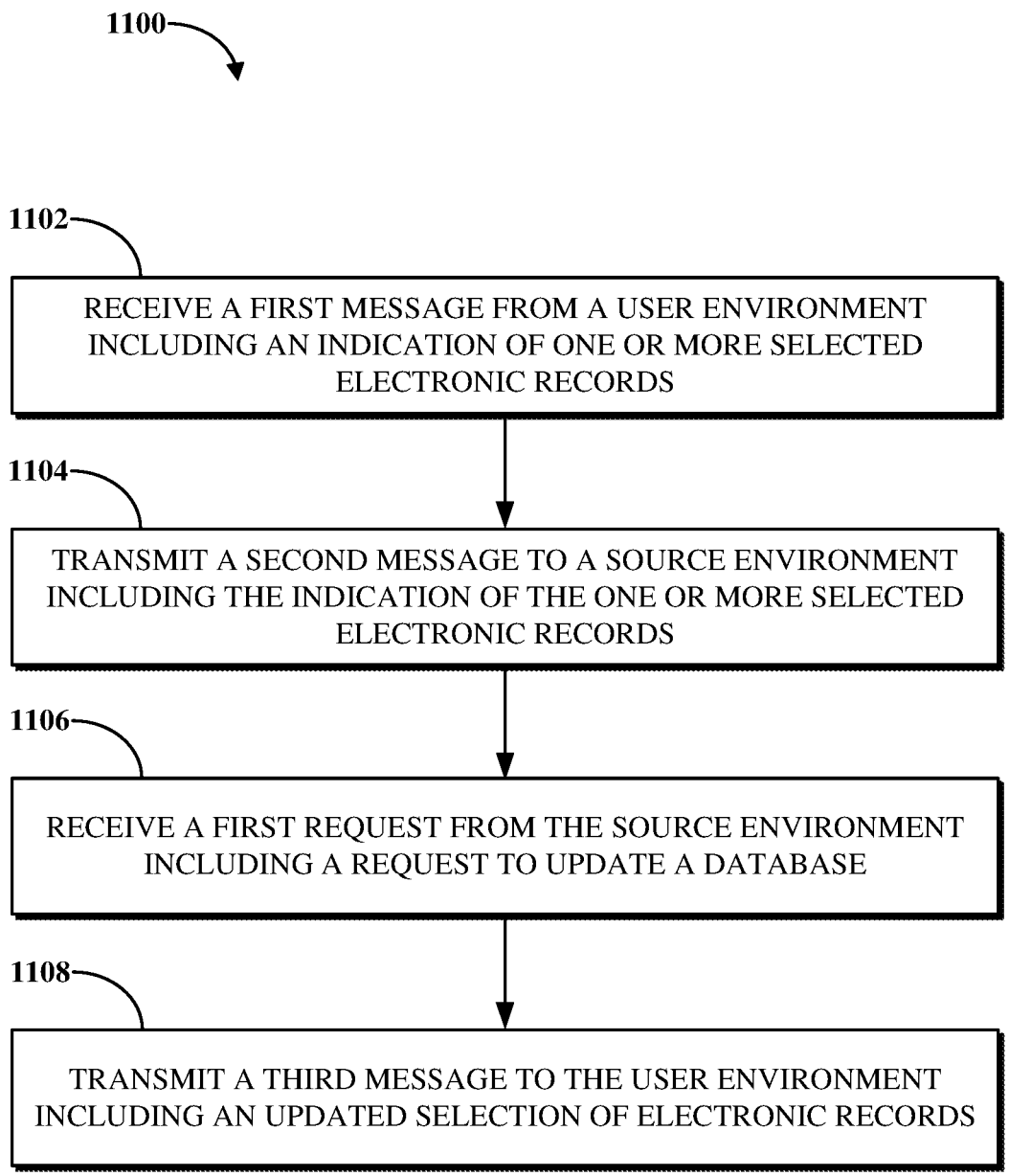
FIG. 11 is a flowchart illustrating an example of a third technique for machine learning of selections of electronic records.

FIGS. 9A-B are flowcharts illustrating an example of a first technique 900 for machine learning of selections of electronic records. FIG. 10 is a flowchart illustrating an example of a second technique 1000 for machine learning of selections of electronic records. FIG. 11 is a flowchart illustrating an example of a third technique 1100 for machine learning of selections of electronic records. One or more of the technique 900, the technique 1000, or the technique 1100 can be performed using computing devices, such as the systems, mechanisms, and devices described with respect to FIGS. 1-8. One or more of the technique 900, the technique 1000, or the technique 1100 can be performed, for example, by executing a machine-readable program or other computer-executable instructions, such as instructions or programs described according to JavaScript, C, or other such instructions. The steps, or operations, of the technique 900, the technique 1000, the technique 1100, or any other technique, method, process, or algorithm described in connection with the implementations disclosed herein can be implemented directly in hardware, firmware, software executed by hardware, circuitry, or a combination thereof.

Although the technique 900, the technique 1000, and the technique 1100 are each shown as a series of operations for clarity, implementations the technique 900, the technique 1000, the technique 1100, or any other method, technique, process, and/or algorithm described in connection with the implementations disclosed herein can be performed in various orders and/or concurrently. Additionally, operations in accordance with this disclosure can be performed with other operations not presented and described herein. Furthermore, one or more aspects of the systems and techniques described herein can be omitted.

Referring first to FIGS. 9A-B, in an implementation, the technique 900 includes receiving a first request from a user environment via 902, determining a first selection of electronic records based on the first request via 904, transmitting the first selection of electronic records to the user environment via 906, receiving a first message from the user environment indicating one or more selected electronic records via 908, receiving a second request to determine that a second selection of records from a customer environment correspond to the one or more selected electronic records via 910, determining whether the second selection of electronic records corresponds to the one or more selected electronic records via 912, and transmitting a second message to the customer environment indicative of the results of the determination via 914.

At 902, a first request from the user environment is received within the intermediary virtual environment. The first request includes a request for electronic records corresponding to a customer environment in communication with the intermediary virtual environment. The user environment includes a client device having an agent of the intermediary virtual environment installed thereon the client device. The agent uses a network interface of the client device to communicate with a network interface of the intermediary virtual environment (e.g., of a server device implementing the intermediary virtual environment). The first request is transmitted to the intermediary virtual environment by the agent.

At 904, a first selection of electronic records is determined based on the first request received at 902. The first selection of electronic records is determined using a machine learning mechanism of the intermediary virtual environment. Ones of the first selection of electronic records can include metadata associated with the user environment. The machine learning mechanism can determine the first selection of electronic records by querying a database of the intermediary virtual environment for a set of electronic records corresponding to the customer environment (e.g., identified within the first request, such as where the first request includes an identifier of the customer environment).

The machine learning mechanism can then query the database for first metadata indicating user preferences associated with electronic records of the first set and for second metadata indicating a first subset of the set of electronic records. The subset can include electronic records that have previously been selected within the user environment responsive to previous determinations of selections of electronic records. The machine learning mechanism uses the set of electronic records, the first metadata, and the second metadata to determine a second subset of the set of electronic records by cross-referencing the set of electronic records against the first metadata and the second metadata. The first selection of electronic records is the second subset of the set of electronic records. At 906, the first selection of electronic records is transmitted from the intermediary virtual environment to the user environment. One or more electronic records of the first selection are selected within the user environment.

At 908, a first message is received within the intermediary virtual environment from the user environment. The first message includes an indication of the one or more electronic records selected within the user environment. The indication of the one or more electronic records from the user environment indicates that the one or more electronic records have been processed at the user environment. The indication is transmitted to the intermediary virtual environment by the agent installed within the user environment. Receiving the first message at 908 includes verifying, by a verification mechanism of the intermediary virtual environment, that the one or more electronic records have been processed at the user environment. Third metadata indicating the one or more records as having been selected within the user environment is generated responsive to the first selection of electronic records. The database is then updated by modifying the second metadata using the third metadata.

At 910, a second request is received within the intermediary virtual environment from the customer environment. The second request includes a request to determine that a second selection of electronic records of the customer environment is indicated within the intermediary virtual environment. The customer environment includes a client. Software executing on the client uses a network interface of the client to communicate with a network interface of the intermediary virtual environment (e.g., of a server device implementing the intermediary virtual environment). Receiving the second request at 910 includes receiving an indication that the client has processed electronic records of the second selection from the software executing on the client. The machine learning mechanism of the intermediary virtual environment then updates the database of the intermediary virtual environment to reflect that user preferences exist for the electronic records of the second selection.

At 912, the machine learning mechanism of the intermediary virtual environment determines whether the second selection of electronic records corresponds to the one or more electronic records indicated from the user environment. The determining at 912 includes using a verification mechanism of the intermediary virtual environment to determine whether electronic records of the second selection are indicated as having been selected within a user environment by metadata within the database of the intermediary virtual environment. At 914, responsive to results of the determination at 912 indicating that the second selection of electronic records corresponds to the one or more electronic records indicated from the user environment, a second message is transmitted from the intermediary virtual environment to the customer environment. The second message indicates the results of the determination at 912.

In some implementations, the technique 900 can include transmitting a third message to a source environment based on the second message. For example, the third message can identify the second selection of electronic records. The source environment (e.g., using a selection mechanism thereof) can use the third message to identify a third selection of electronic records of the source environment that corresponds to the second selection of electronic records.

Referring next to FIG. 10, in an implementation, the technique 1000 includes receiving a first message from a source environment including a collection of electronic records via 1002, storing the electronic records of the collection within a database via 1004, receiving a second message from a user environment including an indication of one or more selected electronic records via 1006, and transmitting a third message to the source environment including the indication of the one or more selected electronic records via 1008.

At 1002, a first message is received within the intermediary virtual environment from the source environment. The first message includes a collection of electronic records. Electronic records of the collection of electronic records are associated with the source environment. For example, the electronic records may be generated at the source environment. The collection of electronic records is selectively determined by a selection mechanism executing within the source environment.

At 1004, the electronic records of the collection of electronic records is stored within a database of the intermediary virtual environment. Ones of the electronic records stored in the database are selectable within the user environment. For example, responsive to a request received within the intermediary virtual environment from the user environment for a selection of electronic records, the intermediary virtual environment can transmit one or more electronic records stored in the database to the user environment.

At 1006, a second message is received within the intermediary virtual environment from the user environment. The second message includes an indication of one or more of the electronic records selected within the user environment. For example, the user environment can include a client device. An agent of the intermediary virtual environment can be installed on the client device. The agent can use a network interface of the client device to communicate with a network interface of the intermediary virtual environment (e.g., of a server device implementing the intermediary virtual environment).

The indication of the one or more of the electronic records from the user environment indicates that the one or more of the electronic records have been processed at the user environment. The indication is transmitted by the agent. Receiving the second message from the user environment at 1006 includes verifying that the one or more of the electronic records have been processed at the user environment. First metadata indicating the one or more of the electronic records as having been selected within the user environment is generated responsive to a first selection of electronic records including at least one of the electronic records of the collection of electronic records. The database is then updated by modifying second metadata using the first metadata. The second metadata indicates a subset of electronic records that have previously been selected within the user environment.

At 1008, a third message is transmitted to the source environment from the intermediary virtual environment. The third message includes the indication of the one or more of the electronic records selected within the user environment. In some implementations, the third message is transmitted to the source environment responsive to determining that a selection of electronic records processed within a customer environment corresponds to the one or more of the electronic records selected within the user environment. In some implementations, the third message is transmitted to the source environment prior to determining that a selection of electronic records processed within a customer environment corresponds to the one or more of the electronic records selected within the user environment.

In some implementations, the technique 1000 can include receiving a request from the source environment responsive to the third message and updating the database according to the request. The request includes a request to update the database according to results of an analysis performed against the electronic records associated with the source environment. Updating the database according to the request includes identifying an electronic record of the collection of electronic records within the database and determining a change to make thereto based on the request. The change is based on a result of the analysis indicating one of a similarity to or a difference from the one or more of the electronic records selected within the user environment.

Referring next to FIG. 11, in an implementation, the technique 1100 includes receiving a first message from a user environment including an indication of one or more selected electronic records via 1102, transmitting a second message to a source environment including the indication of the one or more selected electronic records via 1104, receiving a first request from the source environment including a request to update a database via 1106, and transmitting a third message to the user environment including an updated selection of electronic records via 1108.

At 1102, a first message is received within the intermediary virtual environment from the user environment. The first message includes an indication of one or more electronic records selected within the user environment from a selection of electronic records transmitted to the user environment. The electronic records of the first selection of electronic records are stored in a database. Receiving the first message at 1102 includes receiving a second request from the user environment. The second request includes a request for electronic records corresponding to the customer environment. The selection of electronic records is determined based on the first request. Ones of the selection of electronic records include metadata associated with the user environment. The selection of electronic records is then transmitted to the user environment. The first message can be received at 1102 responsive to that transmission.

The user environment can include a client device. An agent of the intermediary virtual environment can be installed on the client device. The agent can use a network interface of the client device to communicate with a network interface of the intermediary virtual environment (e.g., of a server device implementing the intermediary virtual environment). The indication of the one or more electronic records from the user environment is transmitted by the agent and indicates that the one or more electronic records have been processed at the user environment. As such, receiving the first message at 1102 can include verifying that the one or more electronic records have been processed at the user environment. First metadata indicating the one or more electronic records as having been selected within the user environment can be generated responsive to the selection of electronic records. The database can then be updated by modifying second metadata using the first metadata. The second metadata indicates a subset of electronic records that have previously been selected within the user environment.

At 1104, a second message is transmitted from the intermediary virtual environment to the source environment. The second message includes the indication of the one or more electronic records selected within the user environment. In some implementations, the second message is transmitted to the source environment responsive to determining that a selection of electronic records processed within a customer environment corresponds to the one or more of the electronic records selected within the user environment. In some implementations, the second message is transmitted to the source environment prior to determining that a selection of electronic records processed within a customer environment corresponds to the one or more of the electronic records selected within the user environment.

At 1106, a first request is received within the intermediary virtual environment from the source environment responsive to the second message transmitted at 1104. The first request includes a request to update the database according to results of an analysis performed against the selection of electronic records. Receiving the first request at 1106 can include identifying an electronic record of the selection of electronic records within the database. A change to make to the electronic record of the selection of electronic records can be determined based on the first request. For example, the change can be based on a result of the analysis indicating one of a similarity to or a difference from the one or more of the electronic records selected within the user environment. The electronic record of the selection of electronic records can then be updated according to the change.

At 1108, a third message is transmitted from the intermediary virtual environment to the user environment. The third message includes an updated selection of electronic records. Ones of the selection of electronic records are updated in the database according to the results of the analysis to generate the updated selection of electronic records. For example, the first request received at 1106 can include a request to update multiple ones of the selection of electronic records by changing data associated therewith stored in the database. In some implementations, responsive to the third message, a fourth message can be received from the user environment. The fourth message includes an indication of one or more electronic records selected within the user environment from the updated selection of electronic records transmitted to the user environment.

The implementations of this disclosure can be described in terms of functional block components and various processing operations. Such functional block components can be realized by any number of hardware or software components that perform the specified functions. For example, the described implementations can employ various integrated circuit components (e.g., memory elements, processing elements, logic elements, look-up tables, and the like), which can carry out a variety of functions under the control of one or more microprocessors or other control devices. Similarly, where the elements of the described implementations are implemented using software programming or software elements, the systems and techniques can be implemented with any programming or scripting language, such as C, C++, Java, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques could employ any number of conventional techniques for electronics configuration, signal processing or control, data processing, and the like. The words "mechanism" and "element" are used broadly and are not limited to mechanical or physical implementations, but can include software routines in conjunction with processors, etc.

Likewise, the terms "mechanism," "module," or "monitor" as used herein and in the figures may be understood as corresponding to a functional unit implemented using software, hardware (e.g., an ASIC), or a combination of software and hardware. In certain contexts, such mechanisms, modules, or monitors may be understood to be a processor-implemented software mechanism, processor-implemented software module, or software-implemented monitor that is part of or callable by an executable program, which may itself be wholly or partly composed of such linked mechanisms, modules, or monitors.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory memory or media, and can include RAM or other volatile memory or storage devices that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

Computer Program Listing 1:
```
class Auth_LoginController extends Ozmott_Controller_Action
{
    private $config;
    public function init( ) {
        Zend_Registry::get('logger')->info('*** Receiving request from: '.$_SERVERMEMOTE_ADDR');
        $this->config=new Zend_Config_Ini(APPLICATION_PATH.'/configs/application.ini', APPLICATION_ENV);
    }
    public function preDispatch( ){ }
    public function getForm($redirectTo='')
    {
        $form=new Form_LoginForm(array(
            'action'=>'/auth/login/process',
            'method'=>'pose',
            'name'=>'LoginForm'
        ));
        $form->setDecorators(array(
            array('ViewScript', array('viewScripe'=>'/login/LoginForm.phtml')),
        ));
        return $form;
    }
    public function getAuthAdapter(array $params)
    {
        $adapter=new Zend_Auth_Adapter_DbTable(Zend_Db_Table::getDefaultAdapter( ), 'oz_usersVemail_addressVpassword');
        $adapter->setIdentity($params['username']);
        $adapter->setCredential(md5($params['password']));
        return $adapter;
    }
    public $calls=array(
        'account-reset-password2'=>array (
            'controller'=>'account',
            'method'=>'reset',
            'http-method'=>'get',
            'params'=>array( )
        )
    );
    public function indexAction( )
    {
        $redirectTo=$this->_getParam('redirectTo')?(string)$this->_getParam('redirectTo'): NULL;
        $this->view->form=$this->getForm($redirectTo);
        $this->view->calls=$this->calls;
    }
    public function processAction( )
    {
        $request=$this->getRequest( );
        if (!$request->isPost( ))
        {
            return $this->_helper->redirector('index','login','auth');
        }
        $form=$this->getForm( );
        if (!$form->isValid($request->getPost( )))
        {
            $this->view->form=$form;
            return;
        }
        $formValues=$form->getValues( );
        $adapter=$this->getAuthAdapter($formValues);
        $auth=Zend_Auth::getInstance( );
        $result=$auth->authenticate($adapter);
        if (!$result->isValid( ))
        {
            $auth->clearIdentity( );
            $this->view->error='Invalid credentials provided';
            $this->view->form=$form;
        }
        else
        {
            $user_data=Zend_Auth::getInstance( )->getStorage( )->read( );
            $this->_helper->redirector('index', 'index', 'default');
        }
    }
    public function logoutAction( )
    {
        Zend_Auth::getInstance( )>clearIdentity( );
        $this->_helper->redirector('index', 'index', 'default');
    }
}
```

Computer Program Listing 2:
```
private class AuthInfo
{
    private String hostUriStr;
    private String uname;
    private String pword;
    private DefaultHttpClient authdClient;
    public BasicHttpContext httpContext;
    public HttpHost host;
    AuthInfo(String hostUri, String u, String p)
    {
        hostUriStr=hostUri;
        uname=u;
        pword=p;
    }
    public HttpClient getClient( )
    {
        if (authdClient==null)
        {
            host=new HttpHost(hostUriStr, -1, MySchemeStr);
            httpContext=new BasicHttpContext( );
            BasicHttpParams params=new BasicHttpParams( );
            ConnPerRoute connPerRoute=new ConnPerRouteBean(30);
            ConnManagerParams.setMaxConnectionsPerRoute(params, connPerRoute);
            ConnManagerParams.setMaxTotalConnections(params, 40);
            SchemeRegistry httpSchemeReg=new SchemeRegistry( );
            httpSchemeReg.register(MyScheme);
            ThreadSafeClientConnManager cm=new ThreadSafeClientConnManager(params, httpSchemeReg);
            authdClient=new DefaultHttpClient(cm, params);
            authdClient.getCredentialsProvider( ).setCredentials(
                new AuthScope(
                    host.getHostName( ),
                    host.getPort( )
                ),
                new UsernamePasswordCredentials(uname, pword));
        }
        return authdClient;
    }
```

Computer Program Listing 3:
```
class Admin_StoreofferController extends Ozmott_Controller_AdminAction
{
    public function init( )
    {
```

```
$this→_object='Model_Ozmott_StoreOffer';
$this→_object_return='storeoffer';
$this→_PK='store_offer_id';
$this→_action='storeoffer';
parent::init( );
}
protected $_object='Model_Ozmott_StoreOffer';
protected $_object_return='storeoffer';
protected $_PK='store_offer_id';
protected $_action='storeoffer';
public function saveAction( )
{
    $request=$this→getRequest( );
    $form=$this→getForm( );
    if ($request→isPost( ))
    {
    if (!$form→isValid($request→getPost( )))
    {
        $this→view→form=$form;
        return;
    }
    else
    {
        $object=new $this→_object;
        $formValues=$form→getValues( );
        if(!empty($formValues [$this→_PK]))
        {
            $where=$object→getAdapter(    )→quoteInto
                ($this→_PK.'=?',$formValues[$this→_PK]);
            unset($formValues[$this→_PK]);
            $object_id=$object→update($formValues,$where);
        }
        else
        {
            $object_id=$object→insert($formValues);
        }
        $this→_helper→redirector→gotoUrl('/admin/store/de-
            tail/store_idf.$formValues['store_id']);
    }
    }
}
    public function addAction( )
    {
    $id=(int) $this→_getParam('store_id');
    if (empty($id))
    {
        $this→_helper→redirector→gotoUrl('/admin/store/
            list');
    }
    $store=new Model_Ozmott_Store( );
    $this→view→store=$store=$store→find($id)→current(
        );
    $form=$this→getForm( );
    $form→Populate(array('store_id'=>$store→store_id));
    $this→view→form=$form;
    }
    public function deleteAction( )
    {
    $id=(int) $this→_getParam($this→_PK);
    $object=new $this→_object;
    $object=$object→find($id)→current( );
    $store_id=$object→store_id;
    $object→delete( );
    $this→_helper→redirector→gotoUrl('/admin/store/de-
        tail/store_id/'.$store_id);
    }
}
```

Computer Program Listing 4:
```
class Account_CloudController extends Ozmott_Controller-
_WWWAction
{
    public function init( )
    {
    $this→_object='Model_Ozmott_UserOffer';
    $this→_object_return='userOffer';
    $this→_PK='user_offer_id';
    $this→_action='cloud';
    parent::init( );
    }
    public function preDispatch( )
    {
    $this→auth=true;
    $request=$this→getRequest( );
    $this→view→request=$request;
    switch (strtolower($request→action))
    {
        case 'index':
            $this→auth=false;
            break;
    }
    return parent::preDispatch( );
    }
    public function indexAction( )
    {
    $this→_flashMessenger→addMessage(OfferContent);
    }
    public function subnavAction( )
    {
    }
}
```

What is claimed is:

1. A system for machine learning of selections of electronic records between a user environment and a customer environment via an intermediary virtual environment, the system comprising:
a memory;
a processor; and
a network interface,
wherein the memory includes instructions executable by the processor to:
receive a first request from an agent installed on a client device of the user environment, wherein the first request includes a request for electronic records corresponding to the customer environment, wherein the agent uses a network interface of the client device to communicate with the network interface;
determine a first selection of electronic records based on the first request, wherein ones of the first selection of electronic records include metadata associated with the user environment, wherein the instructions to determine the first selection of electronic records based on the first request include instructions to:
query a database for a set of electronic records corresponding to the customer environment, wherein the first request identifies the customer environment;
query the database for first metadata indicating user preferences associated with electronic records of the set of electronic records;
query the database for second metadata indicating a first subset of the set of electronic records, wherein the first subset includes electronic records that have previously been selected within the user environment responsive to previous determinations of selections of electronic records; and determine a second subset of the set of electronic records by cross-referencing the set of electronic records against the first metadata and the second metadata, wherein the first selection of electronic records is the second subset;

transmit the first selection of electronic records to the user environment, wherein one or more electronic records of the first selection are selected within the user environment;

receive a first message from the user environment, wherein the first message includes an indication of the one or more electronic records selected within the user environment;

receive, from the customer environment, a second request including a request to determine whether a second selection of electronic records of the customer environment correspond to the one or more electronic records selected within the user environment, wherein the second selection of electronic records is indicated within the intermediary virtual environment;

determine, responsive to the second request, whether the second selection of electronic records corresponds to the one or more electronic records indicated from the user environment; and transmit a second message to the customer environment responsive to determining that the second selection of electronic records corresponds to the one or more electronic records indicated from the user environment.

2. The system of claim 1, wherein the indication of the one or more electronic records from the user environment indicates that the one or more electronic records have been processed at the user environment, wherein the indication is transmitted by the agent, and wherein the instructions to receive a first message from the user environment include instructions to:

verify that the one or more electronic records have been processed at the user environment;

generate third metadata indicating the one or more electronic records as having been selected within the user environment responsive to the first selection of electronic records; and update the database by modifying the second metadata using the third metadata.

3. The system of claim 1, wherein the customer environment includes a client, and wherein software executing on the client uses a network interface of the client to communicate with the network interface.

4. The system of claim 3, wherein the instructions to receive a second request from the customer environment include instructions to:

receive, from the software executing on the client, an indication that the client has processed electronic records of the second selection; and update a database to reflect that user preferences exist for the electronic records of the second selection.

5. The system of claim 4, wherein the instructions to determine whether the second selection of electronic records corresponds to the one or more electronic records indicated from the user environment include instructions to:

determine that electronic records of the second selection are indicated as having been selected within a user environment by metadata within the database.

6. The system of claim 1, wherein the instructions include instructions to:

transmit a third message to a source environment based on the second message, wherein the third message identifies the second selection of electronic records, and wherein a third selection of electronic records of the source environment corresponds to the second selection of electronic records.

7. A method for machine learning of selections of electronic records between a user environment and a customer environment via an intermediary virtual environment, the method comprising:

receiving, within the intermediary virtual environment, a first request from an agent installed on a client device of the user environment, wherein the first request includes a request for electronic records corresponding to the customer environment, wherein the agent uses a network interface of the client device to communicate with a network interface of the intermediary virtual environment;

determining, using a machine learning mechanism of the intermediary virtual environment, a first selection of electronic records based on the first request, wherein ones of the first selection of electronic records include metadata associated with the user environment wherein determining the first selection of electronic records based on the first request comprises:

querying a database of the intermediary virtual environment for a set of electronic records corresponding to the customer environment, wherein the first request identifies the customer environment;

querying the database for first metadata indicating user preferences associated with electronic records of the set of electronic records;

querying the database for second metadata indicating a first subset of the set of electronic records, wherein the first subset includes electronic records that have previously been selected within the user environment responsive to previous determinations of selections of electronic records; and determining, by the machine learning mechanism, a second subset of the set of electronic records by cross-referencing the set of electronic records against the first metadata and the second metadata, wherein the first selection of electronic records is the second subset;

transmitting, from the intermediary virtual environment, the first selection of electronic records to the user environment, wherein one or more electronic records of the first selection are selected within the user environment;

receiving, within the intermediary virtual environment, a first message from the user environment, wherein the first message includes an indication of the one or more electronic records selected within the user environment;

receiving, within the intermediary virtual environment, a second request from the customer environment, wherein the second request includes a request to determine whether a second selection of electronic records of the customer environment corresponds to the one or more electronic records indicated from the user environment, wherein the second selection of electronic records is indicated within the intermediary virtual environment;

responsive to the second request, determining, using the machine learning mechanism of the intermediary virtual environment, whether the second selection of electronic records corresponds to the one or more electronic records indicated from the user environment; and transmitting, from the intermediary virtual environment, a second message to the customer environment responsive to determining that the second selection of electronic records corresponds to the one or more electronic records indicated from the user environment.

8. The method of claim 7, wherein the indication of the one or more electronic records from the user environment indicates that the one or more electronic records have been processed at the user environment, wherein the indication is transmitted to the intermediary virtual environment by the agent, and wherein receiving a first message from the user environment comprises:

verifying, by a verification mechanism of the intermediary virtual environment, that the one or more electronic records have been processed at the user environment;

generating third metadata indicating the one or more electronic records as having been selected within the user environment responsive to the first selection of electronic records; and updating the database by modifying the second metadata using the third metadata.

9. The method of claim 7, wherein the customer environment includes a client, and wherein software executing on the client uses a network interface of the client to communicate with a network interface of the intermediary virtual environment.

10. The method of claim 9, wherein receiving a second request from the customer environment comprises:

receiving, from the software executing on the client, an indication that the client has processed electronic records of the second selection; and updating, by the machine learning mechanism, a database of the intermediary virtual environment to reflect that user preferences exist for the electronic records of the second selection.

11. The method of claim 10, wherein determining whether the second selection of electronic records corresponds to the one or more electronic records indicated from the user environment comprises:

determining, using a verification mechanism of the intermediary virtual environment, that electronic records of the second selection are indicated as having been selected within a user environment by metadata within the database of the intermediary virtual environment.

12. The method of claim 7, further comprising:

transmitting a third message to a source environment based on the second message, wherein the third message identifies the second selection of electronic records, and wherein a third selection of electronic records of the source environment corresponds to the second selection of electronic records.

13. A non-transitory computer-readable storage medium comprising processor-executable routines that, when executed by a processor, facilitate a performance of operations for machine learning of selections of electronic records selected between a user environment and a customer environment via an intermediary virtual environment, the operations comprising:

receiving, within the intermediary virtual environment, a first request from an agent installed on a client device of the user environment, wherein the first request includes a request for electronic records corresponding to the customer environment, wherein the agent uses a network interface of the client device to communicate with a network interface of the intermediary virtual environment;

determining, using a machine learning mechanism of the intermediary virtual environment, a first selection of electronic records based on the first request, wherein ones of the first selection of electronic records include metadata associated with the user environment, wherein determining the first selection of electronic records based on the first request comprises:

querying a database of the intermediary virtual environment for a set of electronic records corresponding to the customer environment, wherein the first request identifies the customer environment;

querying the database for first metadata indicating user preferences associated with electronic records of the set of electronic records;

querying the database for second metadata indicating a first subset of the set of electronic records, wherein the first subset includes electronic records that have previously been selected within the user environment responsive to previous determinations of selections of electronic records; and determining, by the machine learning mechanism, a second subset of the set of electronic records by cross-referencing the set of electronic records against the first metadata and the second metadata, wherein the first set of electronic records is the second subset;

transmitting, from the intermediary virtual environment, the first selection of electronic records to the user environment, wherein one or more electronic records of the first selection are selected within the user environment;

receiving, within the intermediary virtual environment, a first message from the user environment, wherein the first message includes an indication of the one or more electronic records selected within the user environment;

receiving, within the intermediary virtual environment, a second request from the customer environment, wherein the second request includes a request to determine whether a second selection of electronic records of the customer environment corresponds to the one or more electronic records indicated from the user environment, wherein the second selection of electronic records is indicated within the intermediary virtual environment;

responsive to the second request, determining, using the machine learning mechanism of the intermediary virtual environment, whether the second selection of electronic records corresponds to the one or more electronic records indicated from the user environment; and transmitting, from the intermediary virtual environment, a second message to the customer environment responsive to determining that the second selection of electronic records corresponds to the one or more electronic records indicated from the user environment.

14. The non-transitory computer-readable storage medium of claim 13, the operations further comprising:

transmitting a third message to a source environment based on the second message, wherein the third message identifies the second set of electronic records, and wherein a third selection of electronic records of the source environment corresponds to the second set of electronic records.

* * * * *